United States Patent
Park et al.

(10) Patent No.: US 7,317,671 B2
(45) Date of Patent: *Jan. 8, 2008

(54) APPARATUS AND METHOD FOR COMPENSATING FOR TILT

(75) Inventors: Jee-hyung Park, Seoul (KR); Dong-ki Hong, Gyeonggi-do (KR); Soo-yul Jung, Gyeonggi-do (KR); Ju-wha Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

This patent is subject to a terminal disclaimer.

(21) Appl. No.: 10/299,813

(22) Filed: Nov. 20, 2002

(65) Prior Publication Data

US 2003/0210628 A1     Nov. 13, 2003

(30) Foreign Application Priority Data

May 7, 2002    (KR) ............................ 2002-0025001

(51) Int. Cl.
*G11B 7/095* (2006.01)
(52) U.S. Cl. ................................ 369/53.19; 369/44.32
(58) Field of Classification Search ............. 369/53.19, 369/44.32
See application file for complete search history.

(56) References Cited

U.S. PATENT DOCUMENTS

| 5,627,808 | A   |   | 5/1997 | Hajjar et al. |        |
|-----------|-----|---|--------|---------------|--------|
| 5,898,654 | A   | * | 4/1999 | Shimada et al. | 369/44.32 |
| 6,115,334 | A   | * | 9/2000 | Tsutsui et al. | 369/44.32 |
| 6,282,161 | B1  | * | 8/2001 | Son et al.    | 369/53.19 |
| 6,363,039 | B2  | * | 3/2002 | Hayashi et al. | 369/44.32 |
| 6,430,119 | B1  | * | 8/2002 | Okada et al.  | 369/30.11 |
| 6,680,887 | B2  | * | 1/2004 | Shihara et al. | 369/44.32 |

(Continued)

FOREIGN PATENT DOCUMENTS

| JP | 2000-057607 | 2/2000 |
|----|-------------|--------|
| JP | 2002-050063 | 2/2002 |

OTHER PUBLICATIONS

Japanese Office Action dated May 11, 2004.

*Primary Examiner*—Gautam R. Patel
(74) *Attorney, Agent, or Firm*—Staas & Halsey LLP

(57) ABSTRACT

An apparatus and a method of playing an optical recording medium, including a method of compensating for a tilt by a real time tilt detection before and during a playing operation of the optical recording medium. A tilt compensating apparatus includes an optical pickup, a tilt adjuster which adjust a tilt of the optical pickup, a jitter detector which detects a jittering amount of a playing signal generated from the optical pickup, and a tilt controller which controls operations of the tilt adjuster so as to have the jittering amount become minimum by comparing the jittering amount detected before a reproduction of a content of the optical recording medium with a first jittering reference value, and comparing the jittering amount detected during the reproducing of the optical recording medium, per a certain period, with a second reference value. Since the reproduction of the optical recording medium is performed after a tilt compensation, it takes a shorter time to start the reproduction operation. In addition, an inappropriate tilt compensation can be corrected through a tilt compensation following a jitter monitoring during the reproduction operation.

8 Claims, 3 Drawing Sheets

U.S. PATENT DOCUMENTS 6,845,067 B2 * 1/2005 Ohtsu ...................... 369/44.32
6,914,860 B1 * 7/2005 Joo et al. ................. 369/47.24
6,928,034 B2 * 8/2005 Ohtsu et al. ............. 369/44.29
7,065,020 B2 * 6/2006 Park et al. ............... 369/53.19

* cited by examiner

APPARATUS AND METHOD FOR COMPENSATING FOR TILT

CROSS-REFERENCE TO RELATED APPLICATIONS

This application claims the benefit of Korean Patent Application No. 2002-25001 filed on May 7, 2002, in the Korean Intellectual Property Office, the disclosure of which is incorporated herein by reference.

BACKGROUND OF THE INVENTION

1. Field of the Invention

The present invention relates to an apparatus and a method of playing an optical recording medium, and more particularly, to an apparatus and a method of compensating for a tilt by a real time tilt detection before and during a playing operation of an optical recording medium.

2. Description of the Related Art

Generally, it is possible to effectively read signals recorded on an optical recording medium by maintaining a surface of the optical recording medium perpendicular to a pickup unit. However, the optical recording medium tilts to some extent in cases including a manufacturing process thereof, and usage. Since the recording surface of the optical recording medium cannot be maintained perfectly perpendicular to the pickup unit in a tilted state, an apparatus which compensates for a tilt is employed.

The apparatus which compensates for a tilt maintains the pickup unit to be perpendicular to the recording medium by driving a tilt motor. The tilt motor rotates the pickup unit in a clockwise or a counterclockwise direction in accordance to the tilt state of the recording surface.

A conventional tilt compensating apparatus performs a tilt compensation at an innermost conference and an outermost conference of an optical recording medium, and stores the results before playing the optical recording medium. Next, where the optical recording medium is played, a tilt control value is output by an interpolation according to positions of a current pickup unit with reference to stored tilt correction data. However, a conventional tilt compensating method stores twice the tilt compensation and reciprocation values of the pickup unit from the innermost circumference to the outermost circumference of the optical recording medium. Accordingly, there is a delay in time prior to performing a playing operation of the optical recording medium. In addition, where the tilt compensation is badly performed, the optical recording medium can only be played starting at a position where the badly performed tilt is corrected for the entire region.

SUMMARY OF THE INVENTION

Accordingly, it is an object of the present invention to provide an apparatus which compensates for a tilt using a jitter detected in real time, before and during a playing operation of an optical recording medium, so as to reduce deterioration of optical recording medium playing signals.

It is another object of the present invention to provide a method of compensating for a tilt using a jitter detected in real time, before and during a playing operation of an optical recording medium, so as to reduce deterioration of optical recording medium playing signals.

Additional objects and advantages of the invention will be set forth in part in the description which follows and, in part, will be obvious from the description, or may be learned by practice of the invention.

To achieve the above and other objects of the present invention, there is provided an apparatus which compensates for a tilt in an optical recording medium drive for an optical recording medium, the apparatus comprising an optical pickup, a tilt adjuster which adjusts the tilt of the optical pickup, a jitter detector which detects a jittering amount of a playing signal generated from the optical pickup, and a tilt controller which controls operations of the tilt adjuster so as to have the jittering amount become minimum by comparing the jittering amount detected before a content of the optical recording medium is reproduced and a first jittering reference value, and comparing the jittering amount detected while reproducing the optical recording medium per a certain period and a second jittering reference value.

In response to the reproduction of the content of the optical recording medium beyond a fixed value, the tilt controller may resume an operation of the optical recording medium after performing a tilt compensation by comparing the jittering amount detected where a predetermined target track is reached and a third jittering reference value.

The tilt controller may comprise a storage unit which stores the first through third jittering reference values according to whether the content of the optical recording medium is reproduced or reproduction of the optical recording medium goes beyond a track of the optical recording medium of a fixed value a comparator which compares the jittering amount detected from the jittering detector and a corresponding one of the first through third jittering reference values stored in the storage unit and a tilt controller which controls the operations of the tilt adjuster so as to have the jittering amount become minimum, in response to the detected jittering amount being larger than the corresponding one of the first through third jittering reference values according to the comparison result of the comparator.

To achieve the above and other objects of the present invention, there is provided a method of compensating for a tilt in an optical recording medium drive for an optical recording medium, the method comprising performing a first tilt compensation so as to have a jittering amount detected from the optical recording medium drive become minimum by comparing the jittering amount detected before playing a content of the optical recording medium and a first reference jittering amount and performing a second tilt compensation so as to have the jittering amount become minimum by comparing the jittering amount detected during reproducing of the content of the optical recording medium and a second reference jittering amount.

In response to the reproduction of the content of the optical recording medium beyond a fixed value, the method may further comprise resuming an operation of the optical recording medium after performing a third tilt compensation by comparing the jittering amount detected where a predetermined target track is reached and a third reference jittering amount.

BRIEF DESCRIPTION OF THE DRAWINGS

The above object and advantages of the present invention will become more apparent by describing in detail preferred embodiments thereof with reference to the accompanying drawings in which.

DETAILED DESCRIPTION OF THE PREFERRED EMBODIMENTS

Figure 1:
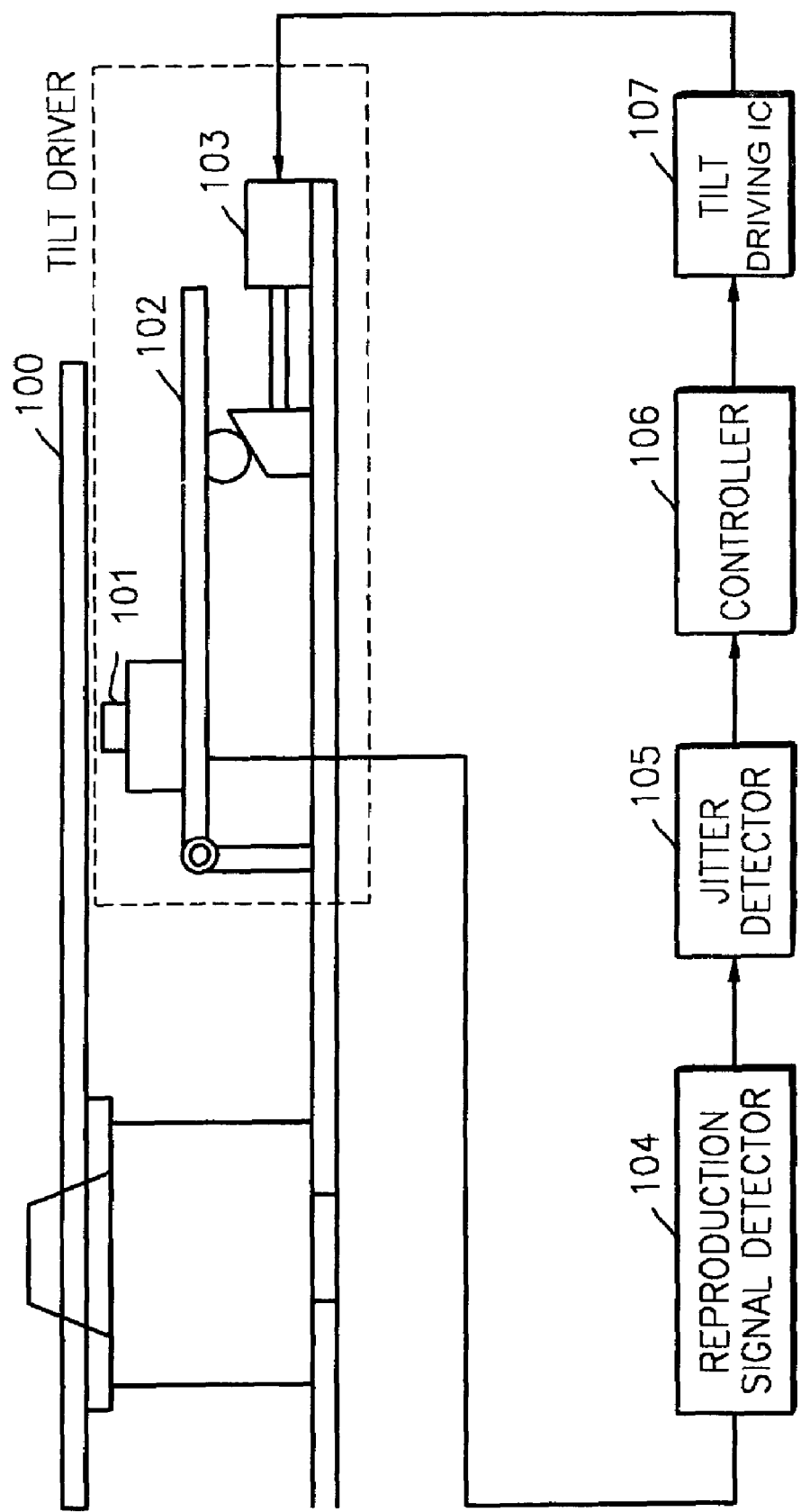
FIG. 1 is a block diagram illustrating a configuration of an apparatus which compensates for a tilt according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a block diagram of an apparatus which compensates for a tilt according to an embodiment of the present invention. The apparatus comprises an optical pickup 101 to read signals from an optical disk 100, a guide 102, a tilt motor 103, a reproduction signal detector 104, a jitter detector 105, a controller 106, and a tilt driving IC 107. A tilt driver of the configuration comprises the optical pickup 101, the guide 102, and the tilt motor 103.

Figure 2:
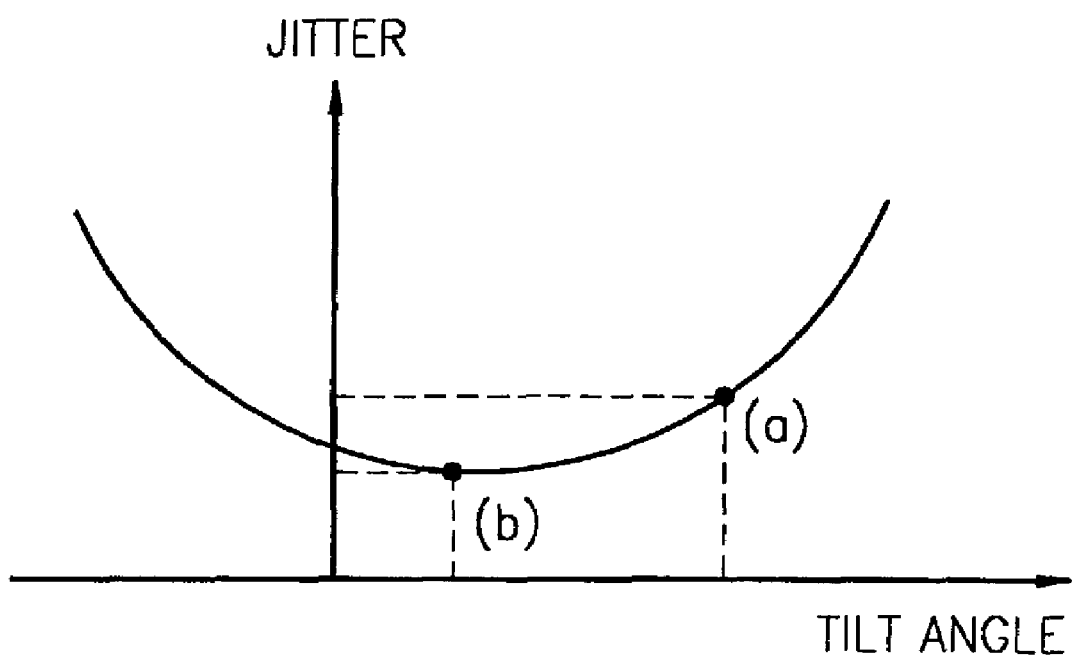
FIG. 2 is a graph illustrating relations between tilt angles and a jitter.

FIG. 2 shows a graph illustrating relations between a tilt angle and jitter.

Figure 3:
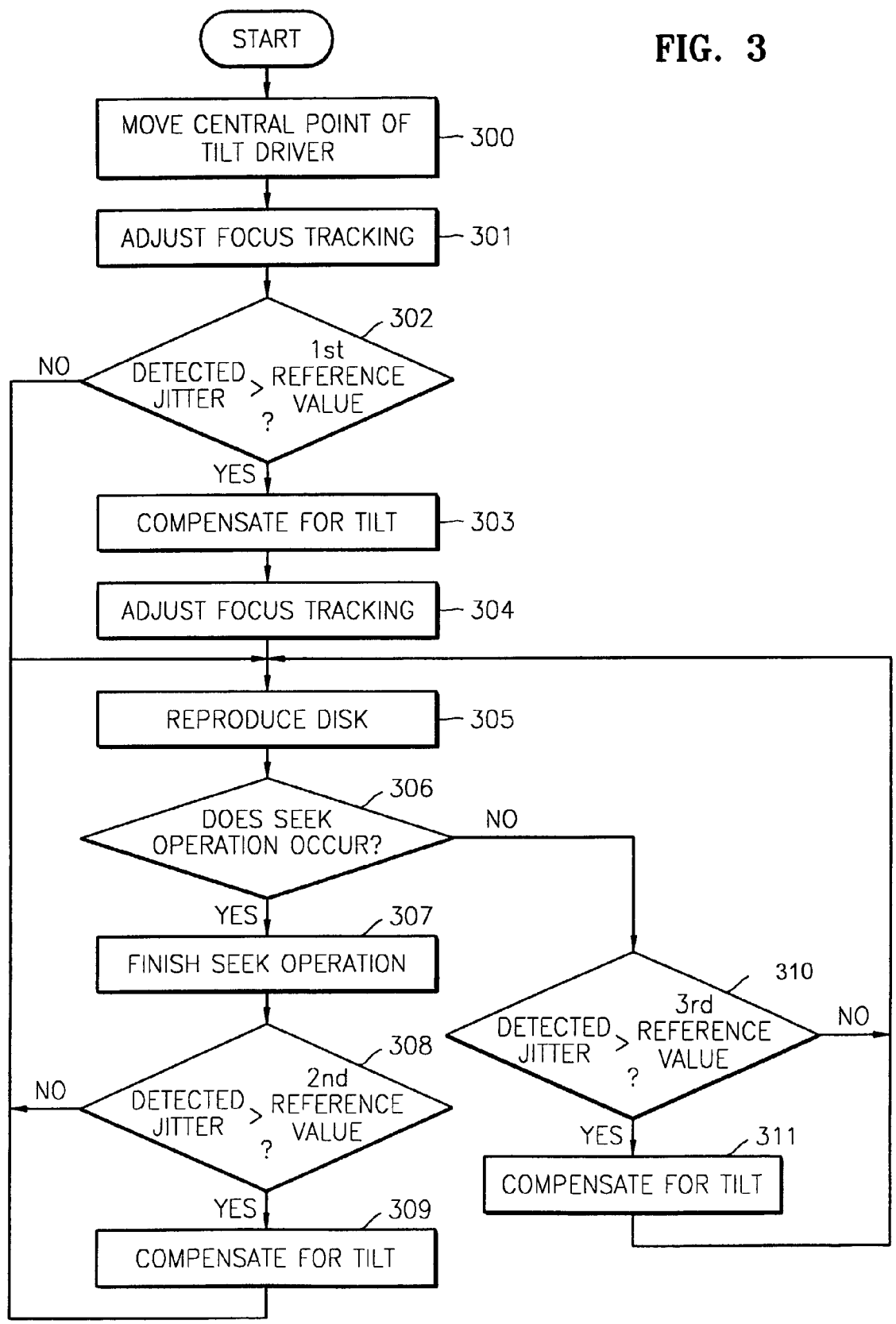
FIG. 3 is a flow chart illustrating a method of compensating for a tilt according to the present invention.

FIG. 3 shows a flow chart illustrating a method of compensating for a tilt according to the present invention. The method comprises moving a tilt driver to a movement point in operation 300, adjusting a focus tracking in operation 301, determining whether a detected jittering amount is larger than a first reference value in operation 302, compensating for a tilt in operation 303 in response to the detected jittering amount being larger than the first reference value, adjusting a focus tracking in operation 304, playing a disk in operation 305, determining whether a seek operation occurs in operation 306, finishing the seek operation in operation 307 in response to the seek operation occurring, determining whether a detected jittering amount is larger than a second reference value in operation 308, compensating for a tilt in operation 309 in response to the detected jittering amount being larger than the second reference value, determining whether a detected jittering amount is larger than a third reference value in operation 310 in response to the seek operation not occurring in the operation 306, and compensating for a tilt in operation 311 where the detected jittering amount is larger than the third reference value in the operation 308.

The present invention will now be described in detail with reference to FIGS. 1 through FIG. 3.

Referring to FIGS. 1 and 2, the apparatus initiates an operation where an optical disk 100 is placed in a playing device (not shown). The optical pickup 101 reads signals from the optical disk 100. Where the optical disk 100 is placed in the playing device, the optical pickup 101 is positioned in an original read-in region of the optical disk 100, and the tilt driver of the apparatus is positioned in a middle of a driving range. Here, the driving range denotes a range within which the guide 102 moves upward and downward, and the middle point of the driving range denotes an average of a vertical distance which the guide 102 can travel. Where the tilt driver is positioned at the middle point of the driving range, a focus tracking is adjusted to an optimal state.

In the present invention, a tilt compensation is performed by, for example, detecting a jitter before and during a playing operation of the optical disk 100. Here, the former refers to a state where an image of the optical disk 100 is not displayed but the optical disk 100 is in an operating mode, whereas the later refers to a state where the image is displayed.

A tilt compensation by detecting a jitter before a reproduction of the optical disk 100 is described below.

The optical pickup 101 reads signals recorded on the optical disk 100, and the reproduction signal detector 104 detects only reproduction signals from the signals read by the optical pickup 101. The jitter detector 105 detects a jittering amount of the reproduction signals detected in the reproduction signal detector 104. The detected jittering amount is input into a controller 106. Although not illustrated, the controller 106 comprises a storage unit which stores a reference jittering amount according to which content reproduction or a seek operation is performed, a comparator which compares the jittering amount detected in the jitter detector 105 with a reference jittering amount, and a tilt controller which controls a tilt driver according to the result of the comparison. Where the detected jittering amount is larger than the reference jittering amount, a signal which minimizes the jittering amount is transmitted to the tilt driving IC 107, and the tilt driver IC 107 operates the tilt driver accordingly. Referring to the graph shown in FIG. 2, which represents relations between tilting angles and a jitter, where the optical disk 100 before the reproduction has a larger jittering amount at the point (a) than a reference jittering amount, a tilt compensation is performed so as to move the tilt driver to the point (b) where the jittering amount becomes a minimum.

A tilt compensation by detecting a jitter during a reproduction of the optical disc 100 is described below.

Where the reproduction of the optical disc 100 is started after the tilt compensation by detecting a jitter, the controller 106 monitors a jitter of reproduction data at constant time intervals. As the optical disc 100 is reproduced, the jitter continuously varies. The optical pickup 101 reads record signals from the optical disc 100, and the reproduction signal detector 104 detects only a reproduction signal from the signals read by the optical pickup 101. The jitter detector 105 detects a jittering amount of the reproduction signal detected by the reproduction signal detector 104, and the detected jittering amount is input to the controller 106. The jittering amount detected at the constant time intervals from the optical disc 100 during the reproduction of the optical disc 100 is compared with a reference jittering amount stored in the storage unit. Where the detected jittering amount is larger than the reference jittering amount, a signal which minimizes the jittering amount is transmitted to the tilt driving IC 107, and the tilt driving IC 107 operates the tilt driver. Referring to the graph shown in FIG. 2, where the optical disk 100 before the reproduction has a larger jittering amount at the point (a) than a reference jittering amount, a tilt compensation is performed so as to move the tilt driver to the point (b) where the jittering amount becomes a minimum.

In a seek operation where the optical pickup 100 moves beyond a value fixed by a user, a tilt compensation is performed before the optical pickup 101 reaches a target value and performs a next operation. If a detected jittering amount, where the optical pickup 100 reaches a target track, is larger than a reference jittering amount stored in the storage unit, a signal which converts the jittering amount into a minimum is transmitted to the tilt driving IC 107, and the tilt driving IC 107 drives the tilt driver accordingly.

That is, referring to FIG. 2, where the optical disk 100 has reached a target value and has a larger jittering amount detected at the point (a) than a reference jittering amount, a tilt compensation is performed so as to move the tilt driver to the point (b) where the jittering amount becomes a minimum. Where the tilt compensation has been completed, a content reproduction of the optical disk 100 is resumed.

A method of compensating for a tilt is described in detail with reference to FIG. 3. The tilt driver is moved to a center point in operation 300. Where the optical disk 100 is placed in a playing apparatus, the optical pickup 101 is first positioned in an initial read-in region of the optical disk 100, and the tilt driver is positioned in a middle of a driving range. Here, the driving range refers to a range within which the guide 102 can move upward/downward, and the middle point of the driving range refers to an average of the range in a vertical direction.

Where the tilt driver is positioned at the middle point of the driving range, the tilt driver adjusts a focus tracking to an optimal state in operation 301. Where, in operation 302, a detected jittering amount is larger than a first reference value, a tilt compensation is performed in operation 303. That is, the detected jittering amount is input to the controller 106, a signal which converts the jittering amount into a minimum is transferred to the tilt driving IC 107, and the tilt driving IC 107 operates the tilt driver.

Where the tilt compensation is finished before a reproduction of a content of the optical disk 100, a focus tracking is adjusted in operation 304, and the content of the optical disk 100 is reproduced in operation 305. Where a seek operation occurs, in operation 306, the procedure waits until the seek operation is completed in operation 307. In a seek operation where the optical pickup 101 moves beyond a value fixed by a user, a tilt compensation should not be performed until the optical pickup 101 reaches a target track.

After the seek operation is finished, in other words, after the optical pickup reaches the target track, where a jittering amount detected in the target track is larger than a second reference value, in operation 308, a tilt compensation is performed in operation 309, that is, a signal which converts the jittering amount into a minimum is transmitted to the tilt driving IC 107, and the tilt driving IC 107 drives the tilt driver.

By detecting a jittering amount in the optical disk 100 during a content reproduction without performing a seek operation, and comparing the detected jittering amount and a third reference value, where the detected jittering amount is larger than the third reference value, in operation 310, a tilt compensation is performed in operation 311. That is, a signal which converts the detected jittering amount into a minimum is transferred to the tilt driving IC 107, and the tilt driving IC 107 drives the tilt driver.

As described above, according to the present invention, a content reproduction operation takes place after a tilt compensation is performed. Accordingly, the present method of compensating for a tilt requires a shorter period of time as compared to a conventional method of compensating for a tilt. In addition, where a tilt compensation is badly performed, the present invention corrects the bad tilt compensations via a jitter monitoring.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus which compensates for a tilt in an optical recording medium drive for an optical recording medium, the apparatus comprising:
    an optical pickup;
    a tilt adjuster which adjusts the tilt of the optical pickup;
    a jitter detector which detects a jittering amount of a playing signal generated from the optical pickup; and
    a tilt controller which controls operations of the tilt adjuster so as to have the jittering amount become minimum by comparing the jittering amount detected before a seek operation and a first jittering reference value, and comparing the jittering amount detected after the seek operation and a second jittering reference value,
    wherein in response to the reproduction of the content of the optical recording medium beyond a fixed value, the tilt controller resumes an operation of the optical recording medium after performing a tilt compensation by comparing the jittering amount detected where a predetermined target track is reached and a third jittering reference value.

2. The apparatus for compensating for a tilt of claim 1, wherein the tilt controller comprises:
    a storage unit which stores the first through third uttering reference values according to whether the content of the optical recording medium is reproduced or reproduction of the optical recording medium goes beyond a track of the optical recording medium of a fixed value;
    a comparator which compares the uttering amount detected from the uttering detector and a corresponding one of the first through third jittering reference values stored in the storage unit; and
    a tilt controller unit which controls the operations of the tilt adjuster so as to have the jittering amount become minimum, in response to the detected uttering amount being larger than the corresponding one of the first through third uttering reference values according to the comparison result of the comparator.

3. The apparatus for compensating for a tilt of claim 1, further comprising:
    a guide which guides the optical pickup;
    a tilt motor which drives the optical pickup;
    a reproduction signal detector which detects the playing signal of signals read by the optical pickup and provides the playing signal to the jitter detector; and
    a tilt driving unit which receives a minimize jitter signal of the tilt controller and operates the optical pickup, the guide, and the tilt motor so as to minimize the uttering amount.

4. The apparatus for compensating for a tilt of claim 3, wherein the tilt driving unit is a tilt driving integrated circuit.

5. The apparatus for compensating for a tilt of claim 1, wherein in response to the optical pickup moving beyond a fixed value, the tilt controller performs a tilt compensation by comparing the uttering amount where the optical pickup reaches a predetermined target track and a third uttering reference value, before the optical pickup reaches a target value and performs a next operation of the optical recording medium.

6. A method of operating an optical recording medium drive for an optical recording medium, the method comprising:
    performing an initializing operation of the optical recording medium driver;
    detecting a uttering amount of the optical recording medium driver prior to a reproduction of the optical recording medium;
    compensating for a tilt in the optical recording medium driver in response to the jittering amount being larger than a first reference value;
    reproducing the optical medium in response to a reproduce signal being input to the optical recording medium driver;

detecting another uttering amount of the optical recording medium driver during the reproduction of the optical medium;

compensating for the tilt in response to the another uttering amount being larger than a second reference value;

performing a seek operation of the optical recording medium drive in response to a seek signal being input to the optical recording medium drive detecting yet another uttering amount of the optical recording medium driver after the performing of the seek operation; and compensating for the tilt in response to the yet another uttering amount being larger than a third reference value, prior to performing another operation of the optical recording medium drive.

7. The method of operating an optical recording medium drive of claim 6, wherein the performing of the initializing operation comprises:

moving a tilt driver of the optical recording medium drive to a movement point of the optical recording medium drive; and performing a focus tracking adjusting operation of the optical recording medium drive.

8. The method of operating an optical recording medium drive of claim 6, further comprising performing a focus tracking adjusting operation of the optical recording medium drive, after compensating for the tilt in the optical recording medium driver, in response to the jittering amount being larger than the first reference value.

* * * * *

UNITED STATES PATENT AND TRADEMARK OFFICE
CERTIFICATE OF CORRECTION

PATENT NO. : 7,317,671 B2  
APPLICATION NO. : 10/299813  
DATED : January 8, 2008  
INVENTOR(S) : Jee-Hyung Park et al.

Page 1 of 1

It is certified that error appears in the above-identified patent and that said Letters Patent is hereby corrected as shown below:

Column 6, Line 17, change "uttering" to --jittering--.

Column 6, Line 22, change "uttering" to --jittering--.

Column 6, Line 23, change "uttering" to --jittering--.

Column 6, Line 28, change "uttering" to --jittering--.

Column 6, Line 30, change "uttering" to --jittering--.

Column 6, Line 41, change "uttering" to --jittering--.

Column 6, Line 48, change "uttering" to --jittering--.

Column 6, Line 49, change "uttering" to --jittering--.

Column 6, Line 58, change "uttering" to --jittering--.

Column 7, Line 1, change "uttering" to --jittering--.

Column 7, Line 5, change "uttering" to --jittering--.

Column 7, Line 10, change "uttering" to --jittering--.

Column 7, Line 14, change "uttering" to --jittering--.

Signed and Sealed this

Twenty-fourth Day of June, 2008

JON W. DUDAS  
*Director of the United States Patent and Trademark Office*